United States Patent [19]

Portelance

[11] 3,924,477
[45] Dec. 9, 1975

[54] CRANK MOVEMENT MECHANISM

[76] Inventor: William Portelance, 510 Salaberry, Mont-Laurier, Quebec, Canada

[22] Filed: July 1, 1974

[21] Appl. No.: 484,969

[52] U.S. Cl. .................................................. 74/44
[51] Int. Cl.² ......................................... F16H 21/72
[58] Field of Search ................................. 74/44, 42

[56] References Cited
UNITED STATES PATENTS

| | | | |
|---|---|---|---|
| 889,859 | 6/1908 | Robertson | 74/44 |
| 2,879,815 | 3/1959 | Papworth | 74/42 |

Primary Examiner—Benjamin W. Wyche
Assistant Examiner—Wesley S. Ratliff

[57] ABSTRACT

A mechanism wherein the movement of a crank is more efficiently produced through additional lever action intermediate the linearly reciprocating member and the crank. This mechanism comprises a rectilinearly reciprocating member having a slot transversely extending such as at right angle to the direction of displacement of the reciprocating member, a connecting rod pivoted at opposite ends to the reciprocating member by a pivot slidable along the latter and to the crank respectively, a reference link pivotally supported at one end about an adjustable pivot and pivotally connected to the connecting rod by this pivot. The connecting rod and the reference link are of a length equal to twice the radial length of the crank.

6 Claims, 3 Drawing Figures

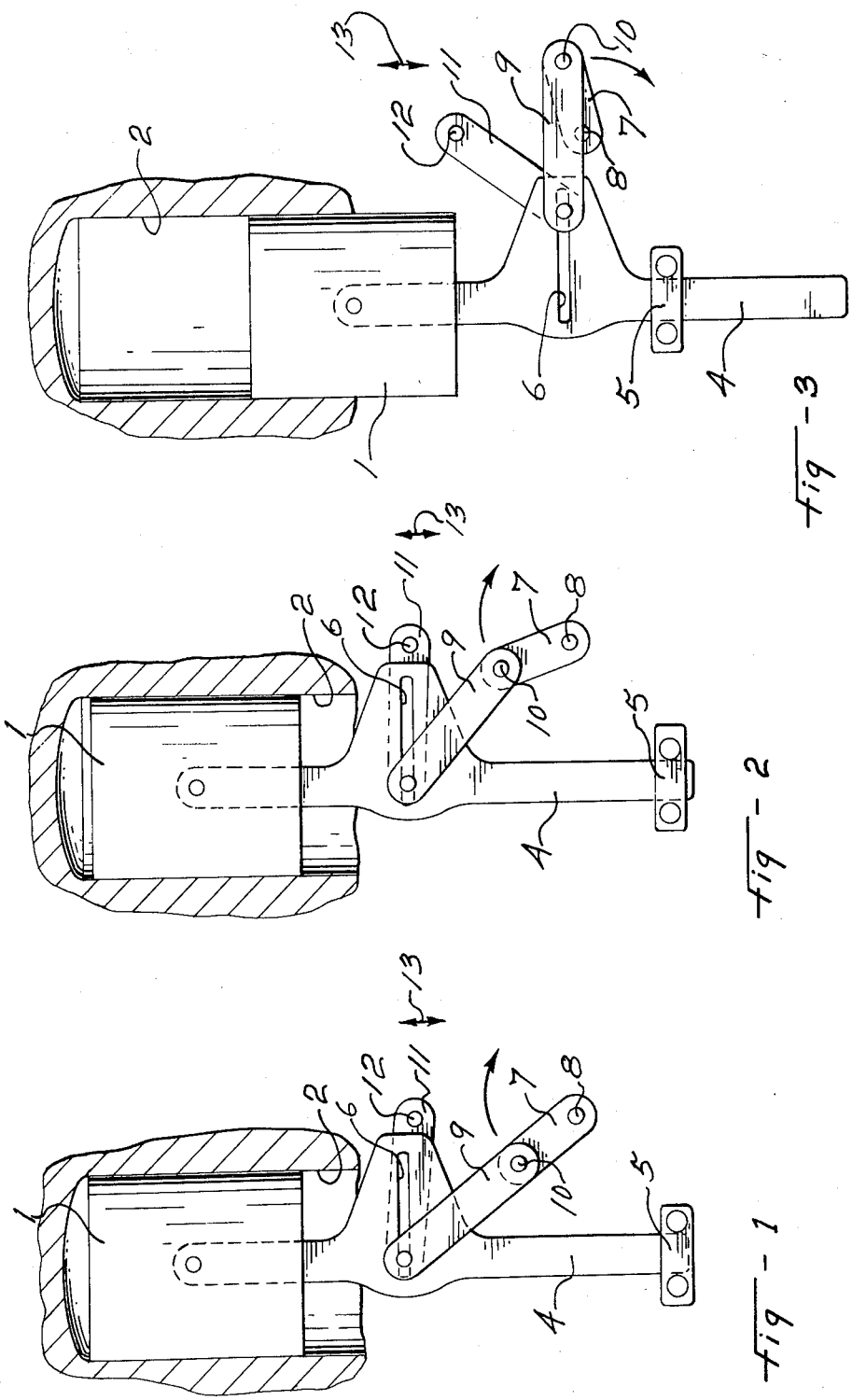

CRANK MOVEMENT MECHANISM

This invention relates to a mechanism to convert a rectilinear reciprocation into rotation and, more particularly, to a crank movement mechanism.

Different mechanisms producing movement of a crank have been proposed so far, such as the type commonly used in internal combustion engines, to convert the linear reciprocation of the pistons and piston rods into rotation.

It is a general object of the present invention to provide a crank movement mechanism particularly adapted to more efficiently convert rectilinear reciprocation into rotation of a crank and which is particularly suited for use in internal combustion engine and reduce the energy consumption thereof.

It is a more specific object of the present invention to provide a crank movement mechanism which includes additional lever action between the linearly reciprocating member and the crank for more efficient transfer from linear reciprocation to rotation.

The above and other objects and advantages of the present invention will be better understood in the light of the following detailed description of a preferred embodiment thereof which is illustrated, by way of example, in the accompanying drawing, wherein:

FIG. 1 is a side view partly in cross-section of a crank movement mechanism associated to the piston of an internal combustion engine according to the present invention and illustrating the elements in their position at the start of the explosion in the cylinder; and FIGS. 2 and 3 correspond to FIG. 1 but with the elements shown during the combustion and at the end of the outward displacement respectively.

The illustrated crank movement mechanism is associated to a piston 1 mounted in the cylinder 2 of a block 3 of an internal combustion engine. The crank movement mechanism itself includes an actuating member 4 which is connected to the piston 1 at one end and guided by a bracket 5 for rectilinear endwise displacement in the axial direction of the piston. The rectilinearly displaceable actuating member 4 is formed with a guideway defined by a slot 6 extending at right angle to the afore-mentioned direction of displacement of the actuating member 4.

A crank 7, schematically illustrated in the drawing, rotates about its rotation axis 8. A connecting rod 9 is pivotally connected at one end by a pin 10 to the outer end of the crank 7. A reference link 11 is pivotally supported by a pivot 12 which is mounted in any suitable manner for transverse adjustment toward and away from the rotation axis 8, as shown by the arrows 13.

In a preferred embodiment of the invention, the rotation axis 8 and the pivot 12 extend in a common plane parallel to the aforementioned direction of rectilinear displacement, and the connecting rod 9 and the reference link 11 are of the same length which is twice the length of the crank 7. Tests conducted with this preferred embodiment have indicated that a substantially increased lever action is produced on the crank 7 and the lateral effort on the piston 1 is avoided as compared to the usual crank, connecting rod and piston assembly, as is conventionally used in internal combustion engines. Consequently, the mechanism of the present invention is more efficient and requires a lower consumption of energy for the same power output on the crank.

Obviously, the mechanism of the invention may be used for other applications than in internal combustion engines where the conversion of rectilinear reciprocation to rotation is desired.

What I claim is:

1. A crank movement mechanism comprising an actuating member, means laterally restraining the latter to substantially exclusive rectilinear displacement thereof, said actuating member having a guideway longitudinally extending transversely to said direction of rectilinear displacement, a crank having an axis of rotation, a rotating arm pivoted at one end about an operatively fixed pivot axis, a connecting rod pivoted at one end to said crank and adapted to actuate the latter, a pivotal connection pivotally connecting the other end of said rotating arm to the other end of said connecting rod, slidable along said guideway, defining a second pivot axis for the rotating arm, and producing lateral displacement of said other end of the connecting rod transversely of the actuating member, and said axes extend transversely to the direction of rectilinear displacement and to the guideway.

2. A crank movement mechanism as defined in claim 1, wherein said actuating member is slidably mounted for reciprocating endwise displacement in said direction.

3. A crank movement mechanism as defined in claim 1, wherein said guideway constitutes a slot and said pivotal connection includes a pin projecting through said slot and laterally displaceable therein.

4. A crank movement mechanism as defined in claim 2, further including a piston reciprocatively displaceable in the direction of rectilinear displacement and said actuating member forms a piston rod secured to said piston for displacement therewith.

5. A crank movement mechanism as defined in claim 1, wherein said operatively fixed pivot axis is defined by a pivot laterally adjustable toward and away relative to the rotation axis of the crank.

6. A crank movement mechanism as defined in claim 4, wherein said operatively fixed pivot axis is defined by a pivot laterally adjustable toward and away relative to said rotation axis and extends with the latter in a plane parallel to said direction of rectilinear displacement, and said connecting rod and said rotating arm are each of a length equal to twice the radial length of the crank.

* * * * *